RE 25232
Nov. 8, 1960      R. W. GOELDNER      2,959,524
PLURAL STAGE FLASH EVAPORATION METHOD
Filed Feb. 29, 1956
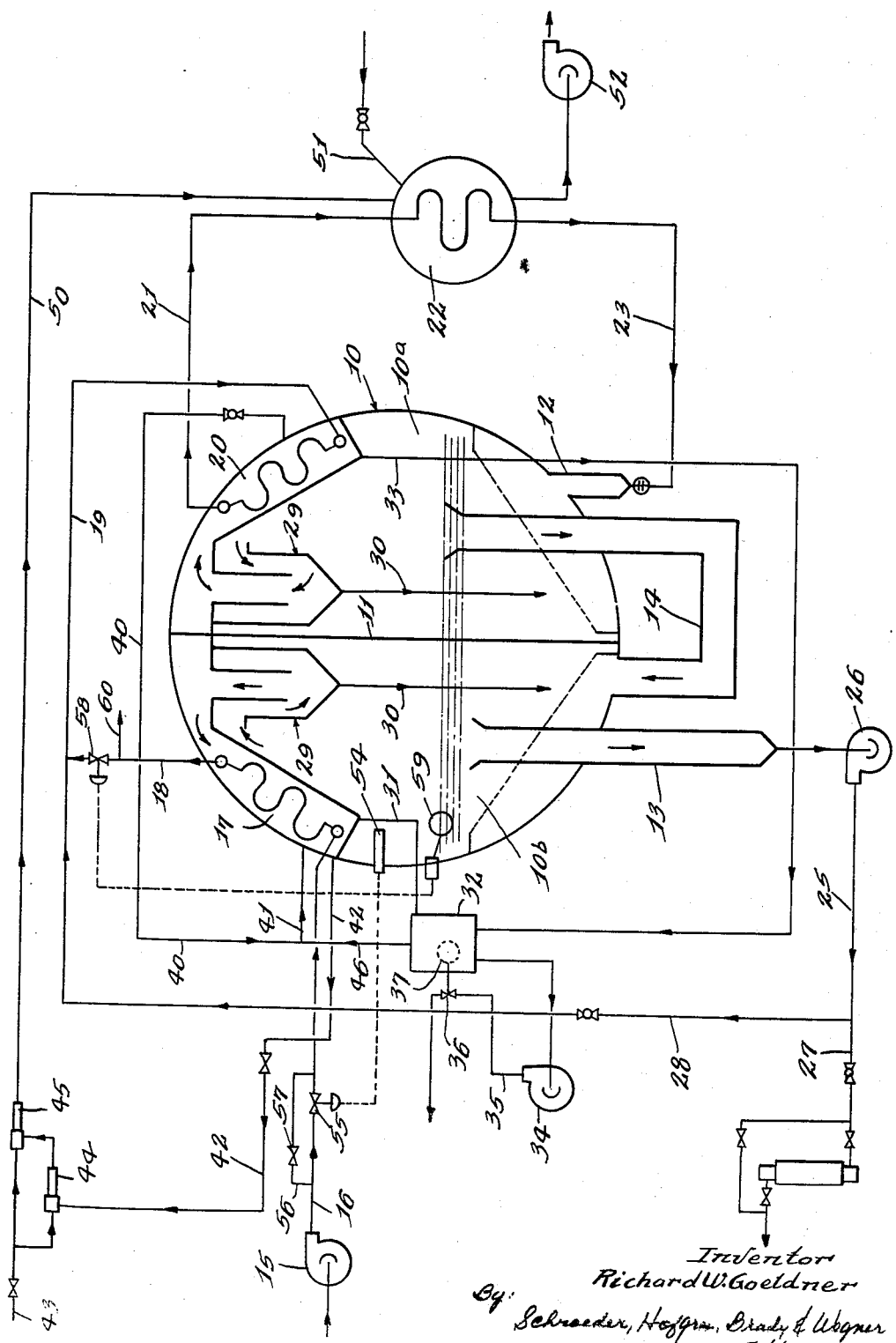
Inventor
Richard W. Goeldner
By Schroeder, Hoffman, Brady & Wagner
Attorneys _United States Patent Office_

2,959,524
Patented Nov. 8, 1960

2,959,524

PLURAL STAGE FLASH EVAPORATION METHOD

Richard W. Goeldner, Milwaukee, Wis., assignor to Cleaver-Brooks Company, a corporation of Wisconsin Filed Feb. 29, 1956, Ser. No. 568,576

4 Claims. (Cl. 202—53)

This invention relates to evaporation and more particularly to a method of evaporating and recovering liquid from a solution and apparatus for carrying out the method.

It is a general object of the invention to provide a new and improved method of and apparatus for evaporating and recovering liquid from a solution.

It is desirable in many operations to evaporate liquid from a solution and to condense the vapor thus evolved so as to recover liquid from the solution in a purified state. For example, ships and submarines operating in salt water require a supply of fresh water for use as boiler makeup water, for drinking purposes, and others, and such fresh water is obtained by evaporating sea water and condensing the vapor therefrom. Evaporating and distilling apparatus for this purpose and like purposes should preferably operate continuously and efficiently over long periods with a minimum of attention and maintenance.

Presently available equipment of the type described is unsatisfactory in certain respects. For example, considerable sea water temperature variation is encountered as the vessel moves from one locality to another, or, in the case of submarines, from the surface to various depths of submergence. These sea water temperature variations alter the operation of the equipment so as to cause variations in the operating temperatures and pressures in the boiling chambers of the distiller, resulting in varying vapor separator loads and, in turn, resulting in varying distillate quality unless constant attention is given and adjustments made to counteract the varying feed water temperature conditions. Also, varying sea water temperatures cause variations in the steam consumption and in the quantity of distillate produced.

With the above and other considerations in mind, it is an object of this invention to provide a new and improved method of and apparatus for vacuum distilling which permit production of distillate at generally uniform rate and of uniform quality with widely varying feed solution temperatures.

It is also an object of the invention to produce a new and improved method of and apparatus for vacuum distilling which permit the maintenance of temperatures and pressures at predetermined levels in a distiller with relatively constant steam consumption even though feed solution temperature varies.

Another object is to provide a vacuum distiller with automatic control maintaining separator loads generally constant even though feed water temperatures may vary considerably.

A further object is to provide a vacuum distiller for submarine service having automatic control for maintaining pressures in the boiling chambers substantially at predetermined levels.

Other objects and advantages will become readily apparent from the following detailed description taken in connection with the accompanying drawings, in which the single figure is a diagrammatic illustration of a vacuum distilling system and apparatus embodying the present invention.

While an illustrative embodiment of the invention is illustrated in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

Referring now to the system illustrated in the drawings, it includes an evaporator 10 comprising a closed vessel of suitable size and shape and having a separator plate 11 dividing the evaporator into at least two stages having first and second boiling chambers 10a and 10b for first and second or last stages of evaporation. The evaporator 10 includes a solution inlet 12 leading to the first boiling chamber 10a and a blowdown outlet 13 leading from the second boiling chamber 10b. The two boiling chambers of the evaporator are connected by a conduit loop 14 which takes overflow from the first stage chamber 10a into the second stage chamber 10b.

Sea water is drawn into the system by means of a pump 15 having its outlet connected to a conduit 16 which delivers the sea water to a first out-of-contact heat exchanger, or condenser, 17 which, as illustrated, is provided within the shell of the evaporator 10 for receiving vapor from the second stage boiling chamber for condensation. The outlet from the condenser 17 is connected to a conduit 18 which is in turn connected to a conduit 19 leading to a second out-of-contact heat exchanger, or condenser, 20 provided in the shell of the evaporator 10 to receive vapor from the first stage boiling chamber for condensation. The feed water outlet from the condenser 20 is connected to a conduit 21 which conducts the feed water from the condenser 20 to a feed water heater 22, from which the feed water is supplied to the evaporator inlet 12 by means of a conduit 23.

Brine, commonly referred to as "blowdown," is withdrawn from the evaporator 10 and delivered to an outlet line 25 by means of a pump 26. As described more fully hereinafter, a substantially fixed, predetermined minor quantity of the blowdown is delivered from the outlet line 25 to a line 27 which may be connected to high-pressure pumps for discharging the blowdown overboard, while a major portion of the blowdown is delivered to a line 28 for recirculation through the system and through the evaporator 10.

Vapor rising from the solution in the boiling chambers of the evaporator 10 passes through tortuous courses provided in separators 29 to the condensers 17 and 20, vapor from the first stage chamber 10a passing to the condenser 20, and vapor from the second stage chamber 10b passing to the condenser 17, as indicated by the arrows in the drawing. Entrained liquid in the steam passing through the separators falls out and returns to the boiling chambers, as indicated by arrows 30. Steam in the condenser 17 is condensed and the condensate passes through a pipe 31 to a distillate receiver or well 32. Condensate from the condenser 20 passes through a pipe 33 to the distillate well 32. The distillate is pumped from the well or receiver 32 by means of a pump 34 having its outlet connected to a pipe 35 having a valve 36 controlled by a float 37 in the well 32 so as to maintain a sufficient quantity of distillate in the well to prime the pump at all times.

The vapor chambers of the condensers 17 and 20 are connected together by a line 40 and a line 41, and these chambers are evacuated through a line 42 permitting reduced pressure above the solution in the evaporator 10 so as to effect boiling and evaporation of the solution in the evaporator at temperatures substantially below 212°

F. For example, the temperature may normally be maintained at 130° F. in the first stage of the evaporator, and at 90° F. in the second stage of the evaporator. Exhaust steam from the turbines or main source of consumption aboard the vessel is utilized to establish a vacuum in the line 42, and for this purpose a conduit 43 leads from the turbine exhaust, for example, and includes double ejectors 44 and 45 having a suitable connection with the line 42 so as to evacuate this line and remove non-condensible so that a vacuum may be established in the evaporator 10. The lines 40 and 41, connecting the vapor chambers in the condensers 17 and 20, also have a connection with the line 46 leading from the distillate well or receiver 32 so that any vapor in the receiver is also withdrawn through the line 42.

Steam passing from the ejectors 44 and 45 passes thence through a line 50 for utilization as a source of heat in the feed water heater 22. This ejector steam supplied to the feed water heater 22 provides only a minor portion of the heat required at the heater 22, and additional heating steam is supplied to the heater 22 through a line 51 which may also lead from the exhaust system at the turbines or other consuming devices on board the vessel. Condensate is withdrawn from the heater by a pump 52.

In the past, systems of the character described have included the practice of pumping the entire blowdown from the evaporator overboard through lines such as that illustrated at 27. This required the use of brine overboard pumps developing extremely high heads in order to oppose the high pressures encountered when a submarine is submerged to great depths. Additionally, this practice required that the entire blowdown withdrawn from the evaporator be continuously replaced by like quantities of fresh sea water drawn into the system. Thus, the entire solution being circulated through the evaporating system was subjected to the varying temperatures encountered in the sea water feed, giving rise to the disadvantages alluded to hereinabove.

According to the present invention, a substantial portion of the blowdown is recirculated through the system, with only a minor portion being pumped overboard. That portion of the brine which is recirculated is mixed with incoming fresh water, and the admission of fresh water to the system is controlled by the temperature in the evaporator, the mixture of the fresh water drawn into the system being controlled by the level of the solution in the evaporator. To this end, the line 28 which is connected to the brine circulating pump 26 is connected in turn to the line 19 which leads to the condenser 20.

A temperature sensing element 54 is provided in the evaporator 10 at the second stage, and this temperature element is connected to control the opening and closing of a valve 55 in line 16 through which fresh water is introduced into the system. The valve 55 is bypassed by a line 56 having a manually controllable valve 57 which permits filling the system quickly on initiating operation. Thus, the admission of fresh solution to the condenser 17 is controlled by the temperature in the evaporator 10 in the second stage.

Fresh solution passing through the line 18 from the condenser 17 for mixture with the recirculating brine in the line 19 is controlled by a valve 58 in the line 18. The valve 58 is connected with a float 59 in the evaporator at the second stage so that the opening and the closing of the valve 58 is regulated by the level of the solution liquid in the evaporator. A waste discharge line 60 leads from the line 18 in advance of the valve 58 so as to discharge that portion of the fresh water introduced which is not mixed with the recirculating brine.

In operation, if the temperature of the sea water encountered by the vessel should rise, this would be reflected in a rise in temperature in the evaporator. If the temperature in the second stage of the evaporator rises above the desired normal temperature (90° F., for example), the rise in temperature is sensed by the element 54 which effects operation of the valve 55 so as to admit additional fresh cooling water to the system. The fresh cooling water passes to the condenser 17 and from there to the conduit 18 from which it passes through either the valve 58 or the waste discharge line 60. In either event, the effect of the fresh cooling water is to lower the temperature until the system is restored to its proper heat balance.

In response to lowering the level of the water in the evaporator for any reason, the float 59 is effective to operate the valve 58 so as to admit additional fresh water for mixture with the recirculating brine in the line 19.

Conversely, if a decrease in sea water temperature is encountered, this is reflected in a lowering of the temperature in the second stage of the evaporator. The temperature sensing element 54 responds to these conditions by reducing the amount of fresh water taken into the system through valve 55 so that the temperature in the evaporator is elevated until the system is restored to its proper heat balance.

If for any reason the water in the evaporator rises above the desired level, the float 59 is effective to operate the valve 58 to reduce the fresh water admitted to the line 19 for mixture with the recirculating brine, so that the water in the evaporator is maintained at the proper level at all times.

Thus, it will be appreciated that I have disclosed a method of and apparatus for vacuum distilling wherein pressures and temperatures in the evaporator are maintained automatically at predetermined values regardless of varying sea water temperatures encountered so as to produce distillate of a uniform quality at a uniform rate. Economy in operation results since the steam consumption is generally constant. An additional advantage of the present system is that scaling is reduced by maintaining the lower temperatures in the evaporator while distillate production remains fairly constant over a wide range of feed water temperature at the inlet.

I claim:

1. The method of operating a flash evaporator having a plurality of stages in series relationship from a first and highest stage to a last and lowest stage, said evaporator having a condenser section and a flash chamber in each stage for distilling salt water which comprises, withdrawing brine from a lower stage of the evaporator, discharging a minor portion of said withdrawn brine to waste, mixing the major portion of said brine with fresh salt water, passing the mixture through the condenser section of a higher stage of the evaporator to condense vapors formed in the flash chamber of said higher stage and then further heating said mixture and introducing the same into the flash chamber of the first stage of said evaporator.

2. The method of operating a flash evaporator having a plurality of stages in series relationship from a first and highest stage to a last and lowest stage, said evaporator having a condenser section and a flash chamber in each stage for distilling salt water which comprises, withdrawing brine from the lowest stage of said evaporator, discharging a minor portion of said withdrawn brine to waste, mixing fresh salt water with the remaining brine of the lowest stage of said evaporator, passing the mixture through the condenser section of a higher stage of the evaporator to condense vapors formed in the flash chamber of said higher stage and to heat said mixture, and then further heating said mixture and introducing the same into the flash chamber of the first stage of said evaporator.

3. The method of operating a flash evaporator having a plurality of stages in series relationship from a first and highest stage to a last and lowest stage, said evaporator having a condenser section and a flash chamber in each stage for distilling salt water which comprises, withdrawing brine from a lower stage of the evaporator, discharging a minor portion of said withdrawn brine to waste, passing fresh salt water through the condenser section of the lowest stage of the evaporator and then discharging a major portion of said fresh salt water to waste, mixing the remaining major portion of said withdrawn brine with the remaining minor portion of said fresh salt water, and passing the mixture through the condenser section of a higher stage of the evaporator to condense vapors formed in the flash chamber of said higher stage, and then further heating said mixture and introducing the same into the flash chamber of the first stage of said evaporator.

4. A method of evaporating salt water in a flash evaporator having a plurality of stages in stage relationship from a first high pressure stage receiving the salt water to a last and lowest pressure stage producing a brine of higher salinity which comprises recirculating a major portion of the brine of the last stage to the first stage, withdrawing a minor portion of the brine from the system, mixing new salt water with the recirculating brine reaching the first stage, said recirculating including passage of the brine through the condenser section of a stage higher than the last stage to condense vapors formed in the flash chamber of said higher stage and then further heating the recirculating brine before introducing it into the flash chamber of the first stage of the evaporator.

References Cited in the file of this patent

UNITED STATES PATENTS

| | | |
|---|---|---|
| 1,782,959 | Elliot | Nov. 25, 1930 |
| 2,398,068 | Worthem et al. | Apr. 9, 1946 |
| 2,441,361 | Kirgan | May 11, 1948 |
| 2,467,174 | Wilson | Apr. 12, 1949 |
| 2,537,259 | Cleaver | Jan. 9, 1951 |
| 2,759,882 | Worthem et al. | Aug. 21, 1956 |

FOREIGN PATENTS

| | | |
|---|---|---|
| 538,999 | Great Britain | Aug. 25, 1941 |

OTHER REFERENCES

Gardner, W. A.: "Multiple Stage Flash-Type Distillation," in Report of the Symposium on Advanced Base Water Supply and Sanitation, U.S. Nav. Cer. Lab., Port Hueneme, Calif., page 117 (Oct. 1953).

UNITED STATES PATENT OFFICE

CERTIFICATION OF CORRECTION

Patent No. 2,959,524                      November 8, 1960

Richard W. Goeldner

It is hereby certified that error appears in the above numbered patent requiring correction and that the said Letters Patent should read as corrected below.

Column 3, line 9, after "non-condensible" insert -- gases --; column 5, line 14, for "stage" read -- series --.

Signed and sealed this 9th day of May 1961.

(SEAL)
Attest:

ERNEST W. SWIDER
Attesting Officer

DAVID L. LADD
Commissioner of Patents